United States Patent Office 3,712,877
Patented Jan. 23, 1973

3,712,877
CURABLE VINYLIDENE FLUORIDE ELASTOMERS CONTAINING PHOSPHONIUM CURING AGENTS
Kalyanji U. Patel, St. Paul, and John E. Maier, Woodbury, Minn., assignors to Minnesota Mining and Manufacturing Company
No Drawing. Continuation-in-part of application Ser. No. 3,396, Jan. 16, 1970, which is a continuation-in-part of application Ser. No. 831,295, June 9, 1969, which is a continuation-in-part of application Ser. No. 802,917, Feb. 27, 1969, which in turn is a continuation-in-part of application Ser. No. 753,618, Aug. 19, 1968. This application July 6, 1971, Ser. No. 160,086
Int. Cl. C08f 29/16, 27/00
U.S. Cl. 260—87.7                           2 Claims

ABSTRACT OF THE DISCLOSURE

A curable vinylidene fluoride elastomer containing a quaternary phosphonium compound as curing agent.

---

This application is a continuation-in-part application of U.S. application Ser. No. 3,396, filed Jan. 16, 1970, now U.S. Pat. No. 3,655,727, which is a continuation-in-part of U.S. application Ser. No. 831,295, filed June 9, 1969, now abandoned, which is a continuation-in-part of U.S. application Ser. No. 802,917, filed Feb. 27, 1969, now abandoned, which is a continuation-in-part application of U.S. application Ser. No. 753,618, filed Aug. 19, 1968, now abandoned.

This invention relates to a method for crosslinking fluorinated polymers and crosslinking compositions for use therein. In one aspect this invention relates to a new vulcanization admixture for producing a crosslinked product of improved physical properties. In another aspect this invention relates to the modification of the characteristics of linear saturated polymers containing halogen substituents on the carbon atoms, particularly those polymers having elastomeric properties.

In general, linear polymers are thermoplastic in nature and exhibit continuous flow under the influence of heat and pressure. Such polymers can be resoftened as often as desired and are usually soluble in selected solvents. However, crosslinked or vulcanized polymers are generally thermoset, i.e. insoluble in most solvents and incapable of being resoftened without decomposition, since they are permanently hardened. A linear polymer may nevertheless contain a small number of crosslinkages without losing its thermoplastic properties. It is often desirable to convert thermoplastic polymers into crosslinked polymers or into partially crosslinked polymers in order to decrease their solubility and thermoplastic flow properties and to obtain a harder and tougher product. The crosslinking of elastomers is commonly referred to as vulcanization.

Among the most difficultly vulcanizable thermoplastic polymers are those prepared by the polymerization of halogenated monoolefins, such as, for example, the copolymers of chlorotrifluoroethylene and vinylidene fluoride, the copolymers of perfluoropropene and vinylidene fluoride and the terpolymers of perfluoropropene, vinylidene fluoride and tetrafluoroethylene. Many of these fluorinated thermoplastic polymers have unique and valuable properties. In some cases, when it is desired to retain these properties and at the same time decrease the thermoplastic flow and solubility, the polymers are crosslinked.

One major use for vulcanized, highly fluorinated elastomers is in gaskets, O-rings and the like, for containing fluids under pressure at elevated temperatures, as, for example, in hydraulic systems in aircraft, or as components of reactors in the processing of chemicals. In use, the elastomer is continually compressed for extended periods of time. If during use the elastomeric part becomes permanently deformed, i.e., undergoes compression set, the seal fails causing leakage. In general, the higher the temperature and the longer the elastomer is under compression, the greater the degree of compression set and accordingly the greater the danger of equipment failure.

It is therefore an object of this invention to provide a new and improved crosslinking system.

Another object of this invention is to provide a new curable, fluorinated polymer admixture.

Still another object of this invention is to provide a method for crosslinking vulcanizable fluorinated elastomers which reduces undesired precuring and scorching and permits a relatively short cure time in the mold.

A further object of this invention is to provide a cured fluorinated elastomer with improved physical properties, including low compression set.

An important object of this invention is to provide a crosslinking or curing system for fluorinated elastomers which utilizes relatively low concentrations of curing agent but which still is capable of conveniently producing a cured elastomer having low compression set and having a minimal amount of residual, unreacted curing agent, thereby reducing the undesirable tendency of the cured elastomer to further cure during actual use, aging or testing.

Other objects and advantages of the present invention will become apparent to those skilled in the art from the accompanying description and disclosure.

Accordingly the invention provides an elastomeric composition curable in reactive association with an acid acceptor and comprises the following components:

(a) a fluorinated elastomeric copolymer of vinylidene fluoride and at least one terminally unsaturated fluoromonoolefin containing at least one fluorine atom substituent on each double bonded carbon atom, each carbon atom of said fluoromonoolefin being substituted only with fluorine, chlorine, hydrogen or a lower fluoroalkyl or fluoroalkoxy radical, at least 10 percent of the chain carbon atoms of said copolymer being —$CH_2$— units, (b) at least one quaternary phosphonium compound, including quaternary phosphonium hydroxides and salts thereof.

The vulcanizable polymers which are cured according to this invention are linear, saturated, fluorinated polymers which contain reactive substituents selected from the group consisting of hydrogen, fluorine and chlorine and which are at least half halogenated. By "half halogenated" is meant that at least one half of the carbon bonded hydrogen atoms of the analogous non-halogenated polymer are replaced by halogen. The preferred vulcanizable polymers are at least half fluorinated; however, it is critical that the polymer chain include —CH$_2$— units. Homopolymers of tetrafluoroethylene and other perfluorinated olefins, and copolymers thereof with other perfluorinated comonomers require very high temperature to effect crosslinking and are not within the scope of this invention.

Linear fluorinated elastomers generally contain disordered, saturated, fluorinated carbon chains which include a substantial number of —CH$_2$— units, usually at least 10 percent of the chain carbon atoms. Disorder in the carbon chains is ordinarily achieved by the copolymerization of at least two monoolefinic compounds of the type hereinafter described. When one of the monoolefinic compounds contains an unsaturated chain of three or more carbon atoms, alkyl side groups, e.g. methyl, ethyl, etc., are present in the final polymer, and these alkyl groups are preferably perhalogenated, most preferably perfluorinated. Points of unbalance in the carbon chain, which are necesssary for elastomeric properties, are provided by these side groups. Such side groups cause a bending of the linear carbon chain and thus provide additional degrees of freedom in space, producing an unsymmetrical chain carbon atom to which they are attached. However, unbalance is also provided by the presence of other unsymmetrical units in the linear carbon chain, such as —CFCl—. Irrespective of the units providing such points of unbalance, whether by two physically different substituent atoms or by a side group on a chain carbon atom, at least 10 percent of the chain carbon atoms should be unbalanced.

The linear, saturated, fluorinated carbon chain in the elastomers may also contain chlorine substituents, provided a single chain carbon atom has no more than one chlorine attached thereto to produce instability or to influence the chemical nature of the elastomer. The presence of more than one chlorine substituent on a single chain carbon atom produces a point of rigidity in the chain, decreasing the flexibility of the chain and the elastomeric properties accordingly.

Among the saturated polymers which may be cross-linked in accordance with this invention are the fluorinated elastomeric copolymers of chlorotrifluoroethylene, vinylidene fluoride, 2-chloroperfluoropropene, a fluorinated methyl vinyl ether, perfluoropropene, tetrafluoroethylene, 1-hydroperfluoropropene (i.e.

CH=CFCF$_3$)

dichlorodifluoroethylene, trifluoroethylene, 1,1-chlorofluoroethylene and vinylidene chloride. These monoolefins may be copolymerized with each other in groups of two or more. They may also be copolymerized with other olefinic compounds such as ethylene. The preferred elastomers are copolymers of vinylidene fluoride with at least one terminally unsaturated fluoromonoolefin containing at least one fluorine atom substituent on each double bonded carbon atom, each carbon atom of said fluoromonoolefin being substituted only with fluorine, chlorine, hydrogen or a lower fluoroalkyl (e.g. perfluoroalkyl) or fluoroalkoxy radical, particularly perfluoropropene, tetrafluoroethylene, chlorotrifluoroethylene and 1-hydroperfluoropropene. Particularly preferred are the fluorinated elastomers produced by copolymerizing perfluoropropene and vinylidene fluoride, as described in U.S. Pat. Nos. 3,051,677 issued Aug. 28, 1962 and 3,318,854, issued May 9, 1967 and those terpolymers produced by copolymerizing perfluoropropene, vinylidene fluoride and tetrafluoroethylene as described in U.S. Pat. No. 2,968,649 issued Jan. 17, 1961. The elastomeric copolymers of perfluoropropene and vinylidene fluoride having between about 15 and about 50 mole percent perfluoropropene are outstanding in this respect.

A wide variety of curing agents has been described in the literature for the curing of the saturated fluoroelastomers. Not only is it necessary to achieve a given level of cross-linking to provide adequate physical strength, but the cross-linking must be achieved at a reasonable rate at reasonable temperatures and times, the resulting product must resist loss of properties on aging at elevated temperatures for extended times, and exhibit low compression set. Additionally, the properties obtained should not depend too critically upon the precise concentration of the curatives and the processing must provide a balance between too slow attainment of the final cured characteristics and too rapid a cure at low temperatures, which impedes processing. Ideally, a material which processes readily at moderate temperatures without advancing (i.e. a stock which is not "scorchy") but which crosslinks very rapidly under curing conditions, still maintaining a desirable balance of physical characteristics and stability, is the objective.

The quaternary phosphonium compounds useful in preparing curable fluoroelastomer compositions are compounds which contain at least one phosphorus atom covalently bonded through carbon-phosphorus single bonds to four organic radicals and, additionally, through an ionic bond to an anion. Such materials, their characteristics and several methods of preparation are described, for example, in "Organo Phosphorus Compounds," G. M. Kosolapoff (John Wiley and Sons, New York, 1950), particularly chapter five. The four organic radicals bonded to each phosphorus atom may be the same or different, and each radical may contain from one to twenty or more carbon atoms, although two to about eight carbon atoms are preferred. The carbon skeletal chain may be linear, branched, or cyclic and may be saturated or unsaturated and may contain atoms other than carbon, such as oxygen, nitrogen or sulfur in addition to carbon. The chain may be substituted or unsubstituted, but the substituents, if any, should preferably not be a strongly acidic radical (i.e. a radical derived from an acid having an ionization constant in water at 25° C. of at least 10$^{-5}$) or a salt thereof (e.g. carboxyl, sulfonic, or phosphonic acid or salts thereof) although active hydrogen in a weakly acidic form, such as a hydroxyl radical, is acceptable in small amounts, e.g. 0.5% by weight or less of the compound. Quaternary phosphonium compounds having too high a molecular weight diffuse less efficiently through the fluorocarbon polymer during the curing process, thus tending to result in some unevenness in cure and less preferred physical properties in the resulting vulcanizate. A generally satisfactory cure can be obtained most effectively with a compound having a molecular weight of not more than about 1,000, and in most cases a molecular weight of not more than about 500 is preferred. The nature of the anion is not critical and is generally determined by the nature of the reactants used in synthesizing the phosphonium compound. The anion is generally monovalent, but it may also be divalent or polyvalent. Typical anions are chloride, bromide, hydroxyl, methoxy, acetate, mercaptate, sulfate, bisulfate and the like. Neutral salts are preferred over acidic or basic phosphonium compounds because of their better stability and easier handling, although it should be recognized that the compounds are normally converted to the neutral or basic form during compounding, since the vulcanizable composition generally contains large amounts of the relatively strong base such as magnesium oxide or calcium hydroxide.

Although useful vulcanizates can be obtained using the quaternary phosphonium compounds alone as curatives, it is frequently desirable to use in addition an accelerator, i.e. a material which significantly increases the rate of cure under curing conditions without unduly accelerating the rate of cross-linking during mixing and milling. The resulting combination generally has a more desirable balance of scorch and cure rate than compositions containing only the quaternary phosphonium compound. Such accelerators are well known and are described in the literature, for example, in U.S. Pats. Nos.

3,243,411 and 3,502,628. Heretofore, these accelerators have been used with curing systems based on curatives such as amines rather than the quaternary phosphonium compounds of this invention. A particularly preferred class of accelerators is the oxidizable aromatic hydroxy or amino compounds, that is nucleophilic compounds in which one or more hydroxyl, primary amino, or secondary amino radical is bonded through the oxygen or nitrogen atom of the radical to an aromatic nucleus, such as phenyl, naphthyl, and the like.

A further component which desirably is contained in the final curing recipe is an acid acceptor, preferably an inorganic acid acceptor. Suitable acid acceptors are bases and include magnesium oxide, lead oxide (litharge, PbO), dibasic lead phosphite and zinc oxide, with magnesium oxide being preferred. The acid acceptors are used in amounts ranging from 2 to 25 parts per 100 parts of polymer. In addition an "optional base" is often desired as a cure accelerator. These optional bases are basic compounds and include inorganic oxides and hydroxides such as calcium hydroxide, barium carbonate, strontium hydroxide, and the like. The optional bases are preferably used in amounts ranging from 0.5 to 10 parts per 100 parts of polymer.

Although not necessary, the composition may also contain as cocuratives at least one aromatic amine (primary, secondary or tertiary), aliphatic tertiary amine, or a compound which is stable in the absence of water at temperatures below about 75° C. and which at temperatures above about 125° C. in the presence of water generates a basic nitrogen atom-containing compound (i.e. a compound having a $pK_b$ in water of no more than about 14) having at least one hydrogen atom bonded to said basic nitrogen atom (preferably generates a primary or secondary amine, a hydrazine or ammonia), all of which will be referred to herein as "amines." Amines having too high a molecular weight diffuse less efficiently through the fluorocarbon polymer during the curing process, thus tending to result in uneven cure and inferior physical properties of the resulting vulcanizate. Generally, a satisfactory cure can be obtained most effectively with an amine having a molecular weight of not more than about 1000, and in most cases an amine having a molecular weight of not more than about 500 is preferred. In order to obtain optimum physical properties, particularly resistance to changes during aging and resistance to solvents, it is desirable that the amine equivalent weight (i.e. total molecular weight divided by the number of basic nitrogen atoms in the molecule) in the free amine should be no greater than about 500, and preferably no greater than about 300.

The mechanism of curing saturated copolymers of vinylidene fluoride with, for example, perfluoropropene, is not fully understood. Existing evidence suggests that the initial press cure involves a base-catalyzed release of hydrogen fluoride to generate double bonds in the polymer, these double bonds then providing a limited number of crosslinks between the polymer chains which serve to stabilize the shape and form of the polymer, while the subsequent postcure step results in the formation of further ethylenically unsaturated structures which combine to form benzenoid crosslinks of high thermostability. This is consistent with our findings that a variety of compositions function as curing or crosslinking agents, acting to aid in the release of hydrogen fluoride. Most free primary or secondary aliphatic amines (insofar as they are not in themselves amine generators), free hydrazine or free ammonia are not suitable as cocuratives, and their use as such results in either too rapid a cure rate or no cure at all. Compounds equivalent to the amines, such as triphenylstibine, triphenylbismuthine, triphenylarsine, dibutyl tin sulfide and tributylphosphine, may also be employed in similar fashion as cocuratives. Quaternary ammonium compounds may also serve as cocuratives.

The quaternary phosphonium compound, alone or premixed with other compounding ingredients, may be conveniently milled into the elastomer gum stock, either as a finely divided solid or as a solution in an inert, volatile solvent, e.g. methanol. Thus mixed, the stock can be stored at room temperature (i.e. about 80° F. or 27° C.) for extended periods, e.g. at least six months. It may also be desirable in some instances to employ retarding agents, plasticizers, fillers, and other conventional additives.

The proportions of components of the curing system are set forth below in parts by weight. (All amounts referred to herein are in parts per 100 parts of polymer abbreviated "pphr.," unless other wise indicated.) These proportions are general ranges and the particular amount for each particular cure, time and temperature will become apparent to those skilled in the art.

Formulation Limits

| Component: | Pphr. (range) |
|---|---|
| Quaternary phosphonium compound | 0.1–5 |
| Acid acceptor | 0–25 |
| Optional base | 0–25 |
| Acid acceptor+optional base | 3–40 |
| Oxidizable hydroxy or amino compound | 0–5 |
| Amine | 0–2.5 |

Although useful elastomers are obtained within the aforementioned formulation limits, elastomeric products having particularly desirable compression set values may be obtained by varying the relative amounts of the components within the specified ranges.

Use of larger amounts of quaternary phosphonium compounds tends to increase the cure rates and provide a tighter cure. However, excessive amounts may promote excessive curing on aging and to effect, for example, higher compression set and lower elongation values. Generally, when an amine is used, the lowest amount of amine which will provide the desired rate of cure and level of compression set at practical curing temperatures is preferred and, in fact, amounts much in excess of about 2.5 pphr. are undesirable because of the adverse effect on heat aging properties.

Quaternary phosphonium compounds, when used in amounts as small as 0.1 pphr., produce a cure. An excess of the quaternary compound, over about 1 pphr., particularly when more than about 2 pphr., tends to effect an overcured vulcanizate, although in general the higher molecular weight quaternary phosphonium compound can be used in greater amounts than those of lower molecular weights.

Of the acid acceptors, magnesium oxide is preferred. At least about 2 pphr. is required to provide a reasonable level of cure and rate of cure. While a satisfactorily curable composition can be obtained using only, for example, three parts of an optional base such as calcium hydroxide, it is generally preferred to use at least one part of acid acceptor such as magnesium oxide, along with the optional base to obtain improved resistance to heat aging. The maximum amount for the acid acceptor as listed in Table I is not critical, as much as 50 to 60 pphr. producing a usable but hard stock. Generally, however, no more than about 25 parts is necessary for adequate curing. Alternatively, zinc oxide, litharge or dibasic lead phosphite may be used in approximately the same proportions, and calcium oxide may sometimes be used.

In addition to the above acid acceptors, when an optional base is desired as an accelerator, it is usually present in amounts of from about 0.5 to 25 pphr. Calcium hydroxide is preferred, barium carbonate being milder and generally being used in somewhat larger amounts. At least about three parts of combined acid acceptor and optional base is generally used, for satisfactory curing. Use of eight parts or more minimizes shrinkage during milling and preforming operations.

Fillers are often added to the polymers discussed above to improve the molding characteristics and other properties. When a filler is employed it is added to the vulcanization recipe in amounts of up to about 100 parts pphr., preferably between about 15 and about 50 parts. Examples of fillers which may be used are reinforcing thermal grade carbon blacks or non-black pigments of relatively low reinforcement characteristics such as clays, barytes, etc. Plasticizers, softeners and processing aids, preferably esters or ketones, may also be added if desired.

In accordance with this invention, the desired amount of the components of the crosslinking system is added to the unvulcanized fluorocarbon polymer (i.e. gum stock) and is intimately admixed therewith or compounded by employing any of the usual rubber mixing devices, such as Banbury mixers, roll mills, or any other convenient mixing device. It has been found that a two-roll rubber mill equipped with heat exchange means, e.g. cored chambers for cooling, is particularly suitable since the heat generated by the high shearing forces in mixing can be dissipated and the temperature more accurately regulated with this device or with devices providing other means for temperature control.

For best results the temperature of the mixture on the mill is not allowed to rise above about 250° F. (120° C.) and is not allowed to fall below 30° F. (0° C.). During milling it is necessary to distribute the crosslinking agent uniformly throughout the curable polymer. However, it is also desirable to prevent extensive crosslinking in the compounding step since most of these fluorinated polymers cannot be molded or extruded after a substantial amount of crosslinking has taken place.

The curing process typically comprises pressing the compounded mixture in a mold and then baking the pressing in an oven. Pressing of the compounded mixture (press cure) is conducted at a temperature between about 200° F. (95° C.) and about 450° F. (230° C.), preferably between about 300° F. (150° C.) and about 400° F. (205° C.) for a period of from 1 minute to about 15 hours, usually from 5 minutes to 30 minutes. A pressure of between about 7 and about 210, preferably between about 35 and about 70, kg./cm.$^2$ is imposed on the compounded mixture in the mold. The molds may be first coated with release agents, such as a silicone oil, and prebaked. The molded vulcanizate is then usually post cured (oven cured) at a temperature between about 300° F. (150° C.) and about 600° F. (315° C.), usually at about 400° F. (205° C.) for a period of from 2 hours or less to 50 hours depending on the cross-sectional thickness of the sample. The temperature during the post cure is usually raised gradually from the lower limit of the range to the desired maximum temperature selected. The maximum temperature used is preferably about 500° F. (260° C.) and is held at this value for at least 24 hours.

The following examples are offered as a better understanding of the present invention and are not to be unnecessarily construed as limiting the scope thereof. In the examples, indicated results were obtained using the following test methods:

Mooney Scorch: ASTM D 1646–63 using the small rotor.
Compression set (plug): ASTM D 395–61 method B using a 1" (25 mm.) diameter x 0.5" (12.5 mm.) thick sample compressed to 0.375" (9.5 mm.) for the indicated time at the indicated temperature. One half hour was allowed after the release of pressure for relaxation and temperature equilibration.

Compression set (O-ring): ASTM D 395–61 Method B using a one-inch ID by 1.28 inch OD (0.139 thickness) O-rings compressed to 0.105 inch for the indicated time at the indicated temperature. One-half hour was allowed after the release of pressure for relaxation and temperature equilibrium.

Tensile strength at break (elongation at break, modulus at 100% elongation): ASTM D 412–62T on a sample cut from 0.07" (1.8 mm.) sheet with a die having the following dimensions: A=0.125" (3.5 mm.); L=0.75" (19 mm.); C=2.0" (51 mm.).

Accelerated aging: ASTM D 573–53 exposed for 16 hours at 600° F. (315° C.).

Press cure: Unless otherwise noted sheets were prepared 3" x 6" x 0.07" (75 x 150 x 1.8 mm.) pressed at about 1,000 p.s.i. (70 kg./cm.$^2$) for 20 minutes at 320° F. (160° C.) for physical property determinations; plugs for compression set were 1" (25 mm.) diameter x 0.5" (12.5 mm.) thick, pressed at about 2,000 p.s.i. (140 kg./cm.$^2$) for 30 minutes at 320° F. (160° C.). O-rings for compression set were 1.28 inches OD by one inch ID, pressed at about 2,000 p.s.i. for 20 minutes at 335 degrees F.

Post cure: Samples were removed from the press and placed in a circulating air oven. The oven was maintained at 300° F. (150° C.) for 2 hours, increased to 350° F. (175° C.) and held for 2 hours, increased to 400° F. (205° C.) and held for 20 hours, then increased to 500° F. (260° C.) and held for 24 hours, unless otherwise noted.

From the illustrative data in Table I it is evident that the quaternary phosphonium compounds showed no rise in viscosity in 25 minutes at 250° F., evidence that essentially no precuring had occurred. By contrast, the quaternary ammonium compounds had increased significantly in viscosity under the same conditions. The difference in Mooney value at 335° F. is indicative of rate of cure.

Curing characteristics of a vulcanizable composition have generally been determined by means of the Mooney tests at 250 and 335° F., (ASTM D 1646–63); the lower temperature was indicative of the tendency to scorch and the upper temperature of rate of cure during molding, extrusion, etc. More recently, an oscillating rheometer test (ASTM D 2084–71T) has been developed to provide a more sensitive and more realistic measure of curing characteristics. Data in Tables II and III were obtained in accordance with ASTM D 2084–71T; using an oscillator frequency of 900 c.p.m., at an amplitude of ± degreees.

Table II shows the effect of varying concentrations of quaternary phosphonium compound and of quaternary ammonium compound, using different accelerators. Run 9 contains no accelerator and cures at a slower rate.

Table III illustrates the use of various different quaternary phosphonium compounds and indicates that the structure of the quaternary phosphonium compound is not critical for purposes of this invention.

TABLE I

| | BPBr[1] | BPC[2] | BNBr[3] | BNC[4] |
|---|---|---|---|---|
| Fluoroelastomer $C_3F_6/CF_2=CH_2$; 24/76 mol ratio | 100 | 100 | 100 | 100 |
| Carbon black | 30 | 30 | 30 | 30 |
| Magnesium oxide | 10 | 10 | 10 | 10 |
| Calcium hydroxide | 2 | 2 | 2 | 2 |
| Hydroquinone | 1 | 1 | 1 | 1 |
| Quaternary compound | 0.53 | 0.58 | 0.50 | 0.63 |
| Curing characteristics: | | | | |
| Mooney 250° F.: | | | | |
| 10 pt. rise, min | 25+ | 25+ | 25+ | 15 |
| Pts. rise in 25 min | 0 | 0 | 2 | 15+ |
| Mooney 335° F.: | | | | |
| 15 pt. rise, min | 5.2 | 8.75 | 5.2 | 3.2 |
| 30 pt. rise, min | 4.6 | 7.7 | 4.6 | 2.9 |
| Physical properties:[5] | | | | |

TABLE I—Continued

| | | | | |
|---|---|---|---|---|
| Original: | | | | |
| Tensile at break, p.s.i. | 2,004 | 2,140 | 2,130 | 2,090 |
| 100% modulus, p.s.i. | 1,170 | 800 | 1,000 | 1,545 |
| Elongation at break, percent | 160 | 190 | 175 | 135 |
| Hardness, Shore $A_2$ | 73 | 70 | 72 | 76 |
| Aged, 528° F., 72 hrs.: | | | | |
| Tensile at break p.s.i. | 1,360 | 1,355 | 1,230 | 1,340 |
| 100% modulus, p.s.i. | 1,180 | 765 | 1,230 | -------- |
| Elongation at break, percent | 135 | 190 | 100 | 95 |
| Hardness, Shore $A_2$ | 79 | 73 | 79 | 83 |
| Compression set, 400° F., 24 hrs., percent | 6.5 | 4.2 | 8 | 9.8 |

[1] BPBr: $(C_4H_9)_4PBr$.

[2] BPC:

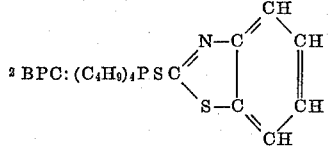

[3] BNBr: $(C_4H_9)_4NBr$.

[4] BNC:

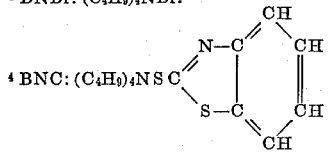

[5] Cure: Sheet, 335° F., 30 min.; plugs, 320° F., 30 min.

TABLE II

| | 1 | 2 | 3 | 4 | 5 | 6 | 7 | 8 | 9 |
|---|---|---|---|---|---|---|---|---|---|
| Fluoroelastomer $C_3F_6/CF_2=CH_2$; 24/76 mol ratio | 100 | 100 | 100 | 100 | 100 | 100 | 100 | 100 | 100 |
| Carbon black | 30 | 30 | 30 | 30 | 30 | 30 | 30 | 30 | 30 |
| Magnesium oxide | 3 | 3 | 3 | 3 | 3 | 3 | 3 | 3 | 3 |
| Calcium hydroxide | 6 | 6 | 6 | 6 | 6 | 6 | 6 | 6 | 6 |
| $(C_4H_9)_4PBr$ | 0.3 | 0.53 | | | 0.53 | | 0.53 | | 2.0 |
| $(C_4H_9)_4NBr$ | | | 0.28 | 0.5 | | 0.5 | | 0.5 | |
| $P-HOC_6H_4OH$ | | | | | 1 | 1 | | | |
| $(CH_3)(C_2H_5)C(C_6H_4OH)_2$ | | | | | | | | 1.5 | 1.5 |
| $(CF_3)_2C(C_6H_4OH)_2$ | 2 | 2 | 2 | 2 | | | 1.5 | | |
| Rheometer: 900 c.p.m. at 350° F.: | | | | | | | | | |
| Minimum torque, lbf·in | 23 | 25.5 | 21.5 | 23 | 20 | 20.5 | 21 | 21 | 19 |
| Time to 1 lb. rise, min | 4.3 | 3.3 | 10.8 | 5.2 | 2.6 | 6.8 | 4.2 | 6.5 | 14.5 |
| Time to 50 lb. rise, min | 6.25 | 4.6 | 20.8 | 8.0 | 4.1 | 13.3 | 6.0 | 9.6 | |
| Torque at 12 min. lbf·in | 95 | 99 | 75 | 93 | 101 | 80.5 | 94 | 97 | 19.5 |
| Maximum slope lbf·in/min | 36 | 58 | 6.5 | 24.5 | 39 | 7 | 50 | 17 | |
| Physical properties:[1] | | | | | | | | | |
| Original: | | | | | | | | | |
| Tensile at break, p.s.i. | 2,225 | 2,040 | 2,170 | 2,210 | 1,890 | 1,870 | 1,512 | 1,825 | [2] 1,490 |
| 100% modulus, p.s.i. | 1,220 | 1,380 | 1,015 | 1,065 | 1,170 | 666 | 923 | 900 | [2] 406 |
| Elongation at break, percent | 160 | 140 | 165 | 165 | 130 | 200 | 150 | 160 | [2] 320 |
| Hardness, Shore $A_2$ | 72 | 75 | 70 | 75 | 73 | 64 | 73 | 68 | [2] 58 |
| Aged, 528° F. for 72 hrs.: | | | | | | | | | |
| Tensile at break, p.s.i. | 1,220 | 1,215 | 1,315 | 1,310 | 1,160 | 962 | 1,015 | 1,030 | |
| 100% modulus, p.s.i. | 1,220 | | 1,100 | 1,310 | | 547 | | | |
| Elongation at break, percent | 100 | 70 | 120 | 100 | 80 | 175 | 80 | 90 | |
| Hardness, Shore $A_2$ | 77 | 82 | 72 | 72 | 81 | 62 | 81 | 77 | |
| O-ring, compression set, 400° F. 72 hrs. percent | 15.3 | 18.4 | 18.7 | 18.7 | 23.5 | | 30.3 | | |

[1] Sheets cured 335° F., 20 minutes; O-rings cured 350° F., 15 minutes; post cure: 500° F., 24 hrs.
[2] Sheets cured 335° F., 90 minutes.

TABLE III

| | 1 | 2 | 3 | 4 | 5 | 6 | 7 | 8 | 9 | 10 |
|---|---|---|---|---|---|---|---|---|---|---|
| Fluoroelastomer $C_3F_6/CF_2=CH_2$; 24/76 mol ratio | 100 | 100 | 100 | 100 | 100 | 100 | 100 | 100 | 100 | 100 |
| Carbon black | 30 | 30 | 30 | 30 | 30 | 30 | 30 | 30 | 30 | 30 |
| Magnesium oxide | 3 | 3 | 3 | 3 | 3 | 3 | 3 | 3 | 3 | 3 |
| Calcium hydroxide | 6 | 6 | 6 | 6 | 6 | 6 | 6 | 6 | 6 | 6 |
| $(CF_3)_2C(C_6H_4OH)_2$ | 2 | 2 | 2 | 2 | 2 | 2 | 2 | 2 | 2 | 2 |
| $(C_2H_5)_2CCH_2P(C_4H_9)_3Cl$ | 0.6 | | | | | | | | | |
| $H_2C=CHCH_2P(C_4H_9)_3Cl$ | | 0.6 | | | | | | | | |
| $HOC_{11}H_{22}P(C_4H_9)_3Br$ | | | 0.6 | | | | | | | |
| $BrC_3H_6OC_3H_6P(C_4H_9)_3Br$ | | | | 0.6 | | | | | | |
| $HOC_3H_6P(C_4H_9)_3Br$ | | | | | 0.6 | | | | | |
| $(C_2H_5)NC_2H_4P(C_4H_9)_3Cl·HCl$ | | | | | | 0.6 | | | | |
| $C_2H_5P(C_4H_9)_3O·O_3C_2H_5$ | | | | | | | 0.6 | | | |
| $CH_3CO_2C_4H_8P(C_4H_9)_3Cl$ | | | | | | | | 0.6 | | |
| $C_6H_5CH_2P(C_4H_9)_3Cl$ | | | | | | | | | 0.6 | |
| $NCC_2H_4P(C_4H_9)_3Cl$ | | | | | | | | | | 0.6 |
| Rheometer: 900 c.p.m. at 350° F.: | | | | | | | | | | |
| Minimum torque, lbf·in | 23 | 20 | 24 | 25 | 26 | 24 | 24 | 25 | 24 | 26 |
| Time to 1 lb. rise, min | 3.5 | 2.2 | 5.4 | 5.5 | 4.5 | 3.5 | 3.1 | 3.0 | 3.1 | 4.3 |
| Time to 50 lb. rise, min | 4.8 | 3.1 | 7.8 | 9.1 | 7.8 | 5.2 | 5.2 | 4.4 | 4.4 | |
| Torque at 12 min., lbf·in | 97 | 106 | 79 | 63 | 62 | 92 | 83 | 93 | 98 | 31 |
| Maximum slope, lbf·in/min | 70 | 110 | 22 | 10 | 11 | 51 | 41 | 56 | 88 | |
| Physical properties:[1] | | | | | | | | | | |
| Original: | | | | | | | | | | |
| Tensile at break, p.s.i. | 2,040 | 2,210 | 2,120 | 1,940 | 1,850 | 1,925 | 1,970 | 2,170 | 2,040 | [2] 1,860 |
| 100% modulus, p.s.i. | 1,000 | 1,225 | 1,070 | 895 | 840 | 1,265 | 1,215 | 1,300 | 1,650 | [2] 530 |
| Elongation at break, percent | 160 | 160 | 170 | 185 | 200 | 140 | 150 | 160 | 170 | [2] 320 |
| Hardness, Shore $A_2$ | 72 | 74 | 72 | 70 | 70 | 73 | 72 | 76 | 73 | [2] 64 |
| Aged, 528° F. for 72 hrs.: | | | | | | | | | | |
| Tensile at break, p.s.i. | | | 1,160 | 1,070 | 1,022 | 1,265 | 1,215 | 1,200 | | |
| 100% modulus, p.s.i. | | | 1,000 | 924 | 833 | 1,265 | 1,215 | 1,200 | | |
| Elongation at break, percent | | | 120 | 140 | 140 | 100 | 100 | 100 | | |
| Hardness, Shore $A_2$ | | | 73 | 74 | 74 | 78 | 80 | 82 | | |
| Compression set, 400° F., 72 hrs., percent | | | 25.0 | 28.1 | 30.3 | 23.5 | 24.2 | 27.3 | | |

[1] Sheets cured 335° F., 20 minutes; O-rings cured 350° F., 15 minutes; post cured: 500° F., 24 hrs.
[2] Sheets cured at 335° F., 1 hr.

What is claimed is:
1. A curable vinylidene fluoride elastomer composition comprising
   a fluorinated elastomeric copolymer of vinylidene fluoride and at least one terminally unsaturated fluoromonoolefin containing at least one fluorine atom substituent on each double bonded carbon atom, each carbon atom of said fluoromonoolefin being substituted only with fluorine, chlorine, hydrogen or a lower fluoroalkyl or fluoroalkoxy radical, at least 10 percent of the chain carbon atoms of said copolymer being —$CH_2$— groups; and
   at least one quaternary phosphonium compound having at least one phosphorus atom covalently bonded through carbon-phosphorus single bonds to organic radicals which have from 1 to 20 carbon atoms and which are free of radicals derived from an acid having an ionization constant in water at 25° C. of at least $10^{-5}$, or salts of such radicals, said quaternary phosphonium compound being present in an amount from 0.1 to 5 parts by weight per 100 parts by weight of said fluorinated elastomer.

2. The curable vinylidene fluoride elastomer of claim 1 in which said elastomer is a copolymer of vinylidene fluoride and perfluoropropene.

References Cited
UNITED STATES PATENTS 3,294,764   12/1966   Pellon et al. _____ 260—80

JAMES A. SEIDLECK, Primary Examiner

S. M. LEVIN, Assistant Examiner

U.S. Cl. X.R.

260—41 C, 47 UP, 80.76, 80.77

UNITED STATES PATENT OFFICE
CERTIFICATE OF CORRECTION

Patent No. 3,712,877      Dated January 23, 1973

Inventor(s) KALYANJI U. PATEL and JOHN E. MAIER

It is certified that error appears in the above-identified patent and that said Letters Patent are hereby corrected as shown below:

Column 3, line 48, "(i.e. $CH=CFCF_3$)" should read:

-- (i.e. $CFH=CFCF_3$) --.

Column 8, line 53, "at an amplitude of $\pm$ degreees." should read:

-- at an amplitude of $\pm$ 3 degrees. --.

Column 8, Table I, lines 12-13, under "Mooney 335° F.:" read: " 15 pt. rise, min---- 5.2   8.75   5.2   3.2
30 pt. rise, min---- 4.6   7.7   4.6   2.9" should read: -- 15 pt. rise, min---- 4.6   7.7   4.6   2.9
30 pt. rise, min---- 5.2   8.75   5.2   3.2 --.

Columns 9-10, Table III, portions are not readable:

Line 6, "$C_2H_5$ $_2CCH_2P(C_4H_9)_3Cl$" should read:

-- $C_2H_5O_2CCH_2P(C_4H_9)_3Cl$ --.

Line 12, "$C_2H_5P(C_4H_9)_3O$ $O_3C_2H_5$" should read:

-- $C_2H_5P(C_4H_9)_3OSO_3C_2H_5$ --.

Line 17, "Minimum torque, lbf·in" in Column 9, reads "4"; should read: -- 24 --

Signed and sealed this 12th day of November 1974.

(SEAL)
Attest:

McCOY M. GIBSON JR.
Attesting Officer

C. MARSHALL DANN
Commissioner of Patents